(12) United States Patent
Brandt et al.

(10) Patent No.: US 6,507,573 B1
(45) Date of Patent: Jan. 14, 2003

(54) DATA TRANSFER METHOD AND SYSTEM IN LOW VOLTAGE NETWORKS

(75) Inventors: Frank Brandt, Geraer Strasse 10A, D-12209 Berlin (DE); Frank Lukanek, Fachinger Strasse 48A, D-13591 Berlin (DE); Christian Hensen, Paderborn (DE); Wolfgang Schulz, Paderborn (DE); Kay Schoenfeldt, Paderborn (DE)

(73) Assignees: Frank Brandt, Berlin (DE); Frank Lukanek, Berlin (DE)

( * ) Notice: Subject to any disclaimer, the term of this patent is extended or adjusted under 35 U.S.C. 154(b) by 0 days.

(21) Appl. No.: 09/381,940

(22) PCT Filed: Sep. 9, 1997

(86) PCT No.: PCT/DE97/02040
§ 371 (c)(1),
(2), (4) Date: Dec. 2, 1999

(87) PCT Pub. No.: WO98/44651
PCT Pub. Date: Oct. 8, 1998

(30) Foreign Application Priority Data

Mar. 27, 1997 (DE) .......................................... 197 14 386

(51) Int. Cl.[7] .............................................. H04B 7/216
(52) U.S. Cl. .................. 370/335; 455/402; 340/870.07; 340/310.02; 340/310.06; 375/137; 379/344
(58) Field of Search ............................... 455/402, 426, 455/63, 40, 41, 66; 370/335, 342, 441; 375/137; 379/93.01, 106.01, 344; 340/870.07, 870.18, 310.01, 310.02, 310.06

(56) References Cited

U.S. PATENT DOCUMENTS

| | | | | |
|---|---|---|---|---|
| 5,311,581 A | * | 5/1994 | Merriam et al. | 379/106.07 |
| 5,406,249 A | * | 4/1995 | Pettus | 340/310.06 |
| 5,818,821 A | * | 10/1998 | Schurig | 370/293 |
| 5,897,607 A | * | 4/1999 | Jenney et al. | 702/62 |
| 5,903,594 A | * | 5/1999 | Saulnier et al. | 375/130 |
| 5,977,650 A | * | 11/1999 | Rickard et al. | 370/3 |
| 6,037,678 A | * | 3/2000 | Rickard | 307/89 |
| 6,218,931 B1 | * | 4/2001 | Ashgar et al. | 340/310.02 |
| 6,243,446 B1 | * | 6/2001 | Goodman | 379/93.01 |
| 6,278,357 B1 | * | 8/2001 | Croushore et al. | 340/310.01 |
| 6,282,405 B1 | * | 8/2001 | Brown | 725/79 |
| 6,346,875 B1 | * | 2/2002 | Puckette et al. | 340/310.01 |
| 6,396,392 B1 | * | 5/2002 | Abraham | 340/310.01 |

FOREIGN PATENT DOCUMENTS

| | | |
|---|---|---|
| DE | 19504587 | 8/1996 |
| EP | 0714193 | 5/1996 |
| EP | 0735700 | 10/1996 |
| GB | 2293950 | 4/1996 |

* cited by examiner

*Primary Examiner*—Edward F. Urban
*Assistant Examiner*—Charles Craver
(74) *Attorney, Agent, or Firm*—Webb Ziesenheim Logsdon Orkin & Hanson, P.C.

(57) ABSTRACT

This invention relates to a method for data transmission in two-way communication via low-voltage systems that are linked to a higher order telecommunication network. Data transmission takes place within the low-voltage system at a high-frequency range of up to 30 MHz using band spreading of data signals and a transmit level below the specified radio interference or noise voltage limit, in that said band-spread data is given a direction coding to specify a logical direction within the low-voltage system using different sequences of a family of pseudo-random numbers to enable multiple-user operation, and in that the binary sequences of data with their user-specific spreading and direction-specific coding are identified by correlation using specified sequences at attenuation-dependent intervals within the low-voltage system, then said data sequences are regenerated and assigned new direction codes for forwarding.

29 Claims, 7 Drawing Sheets

DATA TRANSFER METHOD AND SYSTEM IN LOW VOLTAGE NETWORKS

BACKGROUND OF THE INVENTION

1. Field of the Invention

This invention relates to a method for data transmission in two-way communication via low-voltage systems that are linked to a higher order telecommunication network, and to an arrangement for implementing said method.

2. Background of the Prior Art

Utility companies have highly ramified power supply networks through which they are connected with their customers. This benefit has for a long time been utilized beyond mere energy supply, for example, for tone frequency remote control where data was transmitted in one-way communication systems though with the disadvantage that there was no feedback.

More recently, however, proposals were made to enable the use of the low-voltage systems of utility companies for two-way communication independent of other carriers. While one-way communication just allows the collection of data such as meter readings for electricity, gas, water, etc. or registration of measured values such as temperature, pressure, or alarms, two-way communication can be used to query switching states and to control complex technical facilities. In addition to regular data transmission, the low-voltage system that utility companies have and to which each household is connected can be used for plain ordinary telephone service. According to a known proposal of this kind, the power suppliers who use their low-voltage system for telecommunication have to provide, on the one hand, facilities that act as data filters to make sure that the data is received by its addressees only. On the other hand, devices are required at the network stations that transpose the data to a copper, cellular, or fiber network that connects the stations. It has been assumed as yet that about 100 to 200 households can be connected to one network station. In compliance with the European Celenec EN 50065-1 standard, a theoretically usable data rate of up to 70 kbps would be available for data communication in duplex mode on a dedicated frequency band up to 95 kHz.

A two-way communication system for data transmission between a central station and side stations and between substations and end user facilities is known from DE 195 04 587. Node controllers linked to the low-voltage network function as substations, and a large-area telecommunication network such as a cellular data network or a circuit-switched network, in particular, an optical fiber network, is used for data transmission between the central station and the substations. The node controllers associated with the distributed network transformers are equipped with standard modems that provide an interface between the low-voltage and the large-area telecommunication network whereas a modem with repeater function is provided as an intermediate station on the transmission path between the node controller and the end user facility; data transmission within the local low-voltage network is based on the spread spectrum method.

Data transmission in low-frequency networks uses the frequency range up to 148.5 kHz that is permitted in Europe. However, one setback is that transmission quality is restricted in this frequency range due to numerous interference signals and a high noise level, another setback is that the narrow-band transmission frequency band is limited with regard to the number of subscribers and the bit rate per subscriber.

It is therefore the problem of this invention to provide such a method and such an arrangement for using low-voltage systems that differs from conventional systems in that it combines a high data transfer rate with improved transmission quality, transmission security in ISDN quality, and real-time processing.

SUMMARY OF THE INVENTION

This problem is solved according to the invention by a data transmission method for two-way communication using a low-voltage system linked to a higher-order telecommunications network in that data transmission within the low-voltage system takes place at a high-frequency range of up to 30 MHz using band spreading of data signals and a transmitting level below the specified interference or noise voltage limit of line and radio disturbance characteristics, in that said band-spread data is given a direction coding to specify a logical direction within the low-voltage system using different sequences of a family of pseudo-random numbers to enable multiple-user operation, and in that a correlator placed at an attenuation-dependent distance identifies and regenerates the binary sequences of data with their user-specific spreading and direction-specific coding are identified by correlation using specified sequences at attenuation-dependent distances within the low-voltage system, then said data sequences are regenerated and assigned new direction codes for forwarding.

Alternatively, the process of sequence generation and additional directional coding can be carried out by controlled selection of sequences from various sequence families. Another sequence family is used as direction ID in each network area for band spreading of each user signal.

The limits for radio and line frequency interference are much lower at a higher frequency range, e. g. 10 MHz, than in the frequency range up to 148.5 kHz. But narrow-band interference caused by harmonic waves from other frequency ranges occurs at this range, too, and even the standard radio transmitters interfere with data transmission at this frequency range. On the other hand, the specified maximum output levels, which are very low, must not be exceeded. Furthermore, a signal output at a low level may drop below the noise level due to transmission loss that increases with growing distance and frequency, so that non-spread signal can no longer be received.

Due to its low output level and the high attenuation at this frequency range, the signal to be transmitted would drop below the noise level at a transmission loss of 50 to 70 dB/100 m but in buried cables it can be received below noise level and successfully regenerated at a distance of 100 m. A direction coding using code, time, or frequency multiplexing converts the physical separation which is impossible with data transfer in low-frequency systems into a logical separation, thus enabling duplex operation. Code multiplexing also ensures a multiple-user structure. As direct sequence band spreading is used where, instead of a single information symbol, a sequence of pseudo-random numbers is transmitted in the same time, the bandwidth required for transmission increases by a factor that corresponds to the sequence of pseudo-random numbers. In this way, narrow-band sources of interference and frequency-selective attenuation properties lose their influence on the transmission system.

The proposed method of data transmission at a high frequency range facilitates low-cost bidirectional data transmission in real time via the low-voltage systems of utility companies if buried cables are used. Transmission channels in ISDN quality with a data rate of 64 kbps can be provided, and the overall transmission capacity of the low-voltage line between connected users and the interface between low-voltage system and higher order telecommunication network is a minimum of 2 Mbps for each the forward and back channel with a bit error rate of $10^{-6}$ over 100 m.

In a further development of the invention, a family of pseudo-random sequences such as Gold sequences is used for user-specific band spreading. To prevent mutual interference of users or their terminals, different families of pseudo-random sequences are used in the various network areas.

In an advantageous embodiment, the logical direction of the data stream is preset using code multiplexing, i. e. multiplying the data stream by Walsh sequences the length of which is shorter than that of the band spreading sequences. Alternatively, additional multiplication by Walsh sequences can be left out when specially selected pseudo-random sequences that undercut each other are used in different network areas. The benefit would be reduced signal processing requirements in real-time signal processing but increased channel management requirements.

According to another feature of the invention, the forward and backward directions can be divided to indicate a logical direction in a low-voltage system using time and/or frequency multiplexing; here, the band-spread signals are transmitted in the transmit and receive directions on separate frequency bands or time slots.

First, in the initializing phase prior to the actual data transfer, an initializing sequence plus user ID and a logon sequence are output, and a spread sequence is assigned to the user terminal by means of the user ID.

The arrangement of the invention for carrying out the method consists of a low-voltage system and integrated user terminals, local line distributor boxes and network stations as well as a higher order telecommunications network, with network interworking units being assigned to the network stations to link the low-voltage system and the higher order telecommunications network and with repeater units being placed in the low-voltage system, characterized in that the network interworking units, the repeater units placed at specific distances depending on the degree of attenuation, and the user terminals are designed for band-spreading the data signals at a transmit level below the specified interference or noise voltage limit of line and radio disturbance characteristics and for direction-coding the data signals, and that the repeater units, in addition, are designed for regenerating and direction-specific forwarding of the data stream.

A CDMA processor for spreading the data using its allocated spread sequence and adding the direction code, a modulator for modulating the signals onto a carrier frequency, a controllable amplifier to adjust the input level required at the receiving end for optimum correlator performance, and a physical coupler for feeding the spread and direction-coded data stream into the low-voltage system are assigned to the user terminal. The receiver structure consists of a controllable low-noise input amplifier, an IQ demodulator, an equalizer, preferably a rake receiver, and a CDMA processor for despreading the data signals. The unspread data signals are conditioned for transmission by a channel encoder/decoder in the base band, e. g., a convolution encoder and a Viterbi decoder. A data multiplexer/demultiplexer passes the data on to the voice and data interface that can be configured for any common interface type (e. g., $S_0$, analog a/b, Ethernet). The user terminal has a device ID and an additional SIM (Subscriber Identity Module) allowing partially mobile use of the system. All components are controlled by a microprocessor and a centralized clock generator. The clock signal is synchronized using the data signal received. The transmit and receive signals are fed via a filter or a frequency separator into a physical coupler that also supplies power to the user terminal. In the event of a power failure, operation can be continued for a limited period of time.

The repeater units integrated into the low-voltage system at local line distributor boxes, lamp posts, or, optionally, in house connection boxes include the same functional groups as the user terminal but the functional groups of digital signal processing (equalizer, CDMA processor, channel encoder/decoder) and, optionally, parts of the clock generating unit are configured in accordance with the number of channels to be regenerated multiplied by the number of signaling directions. The error-corrected data signals are fed from the channel decoder into the next channel encoder either directly or via a switching matrix. A device ID is also implemented in the system-like in the user terminal. In addition, the repeater units are characterized in that a data memory is integrated into the system in which the current channel assignments and the associated direction codes and sequence to be used as well as other signal source and sink information are stored. This data memory is managed through the microprocessor.

The network interworking units include the same functional groups as a repeater unit but multiple functional groups of digital data processing (equalizer, CDMA processor, channel encoder/decoder) are configured in accordance with the number of transmission channels to the higher order telecommunication facility provided plus the number of synchronization channels required per low-voltage system. Furthermore, there are multiple gateways and front ends towards low voltage configured depending on the number of network areas to be supplied.

The decoded data signals are fed via a switching matrix into the transmission system that converts the signals on the telecommunication network side into e.g. n * 2 Mbps transmission systems for copper, optical fiber lines, or cellular radio connections, n being dependent on the demand and capacities available and as a rule representing a number between 1 and 3.

A microprocessor system assigns the channels in the network interworking unit by configuring the switching matrix and the CDMA processors. The network interworking unit also has a device ID and a data memory in which the data of all active connections consisting of routing information, channel assignment, signal quality during the connection, user terminal ID, services used, and the assigned transmission channel are stored. Optionally, data rate and protocol adjustment systems can be placed between the switching matrix and the transmission facility to the higher order telecommunication network which adjust potential current or future data formats for a data service to the system structure of the data transmission system on the telecommunications side.

According to yet another feature of the invention, additional high-frequency attenuation equipment can be provided, if required, in highly branched wiring areas of the low-voltage system such as local line distributor boxes, network stations, or areas of industrial customers that have an exceptionally poor noise spectrum. For example, an attenuation element for the frequency range of data transmission can be installed between the line terminal in the distributor box and a tapping point in an unspliced section of the low-voltage cable. A separate physical coupler that is connected to the repeater unit or passively connected to the next physical coupler is used for each line terminal because, as a result of the attenuation element installed, the data signals cannot be switched to another line terminal of another low-voltage cable by direct cable coupling or electromagnetic coupling based on the released signal power.

Other features and useful developments and advantages of the invention are described in the subclaims and in the embodiment described below.

BRIEF DESCRIPTION OF THE DRAWINGS

An embodiment of the invention shall be explained in greater detail based on the enclosed drawing comprising.

DETAILED DESCRIPTION OF THE PREFERRED EMBODIMENTS

Figure 1:
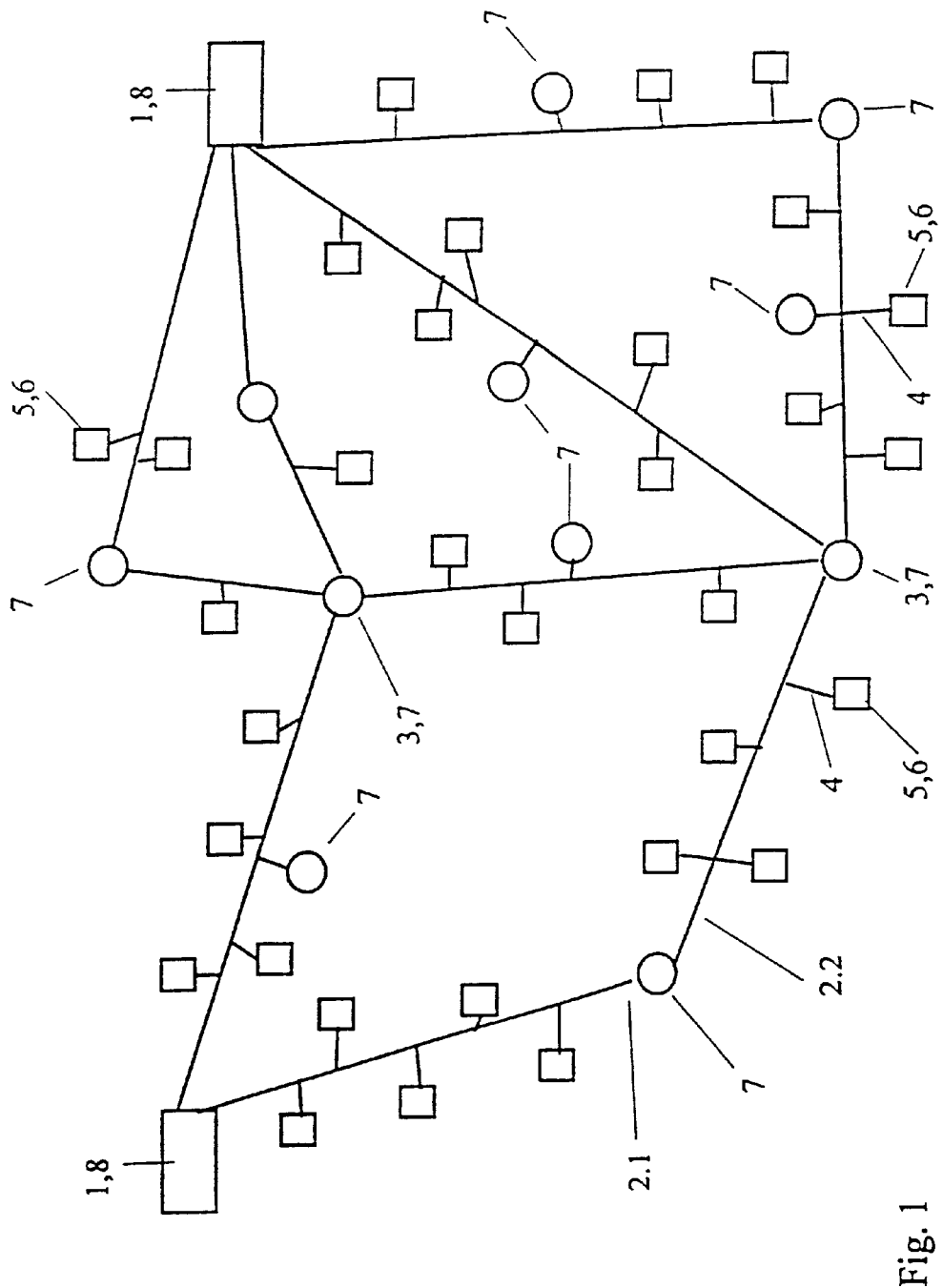
FIG. 1 the structure of the communications network based on a typical low-voltage system.

The basic structure of the communications network according to the invention is that of a low-voltage system. Network stations 1 are connected to local line distributor boxes 3 via low-voltage lines 2 in this communications network. Branch lines 4 leading to the individual users 5 are connected to the low-voltage lines 2 between local line distributor boxes 3 or between a local line distributor box 3 and a network station. The length of the low-voltage line 2 between two local line distributor boxes 3 depends on building density and is about 100 m for areas with high-rise blocks, 200 m with street-lining apartment blocks in the city, and up to 500 m in areas with detached houses. The users 5 are just depicted as an example in FIG. 1; their number is much greater in fact. To function as a data transmission network, user terminals 6 are assigned to the users, and the data from these terminals is transmitted via low-voltage lines 2 and repeater units 7 tapped into them to the network interworking units 8 that are usually located close to the network station 1, or in reverse direction. Alternatively, the network interworking unit can be connected to any point on the low-voltage lines 2, for example near the local line distributor boxes 3, as long as this tapping point is favorably located for connection to the higher order telecommunication network 48.

Figure 2:
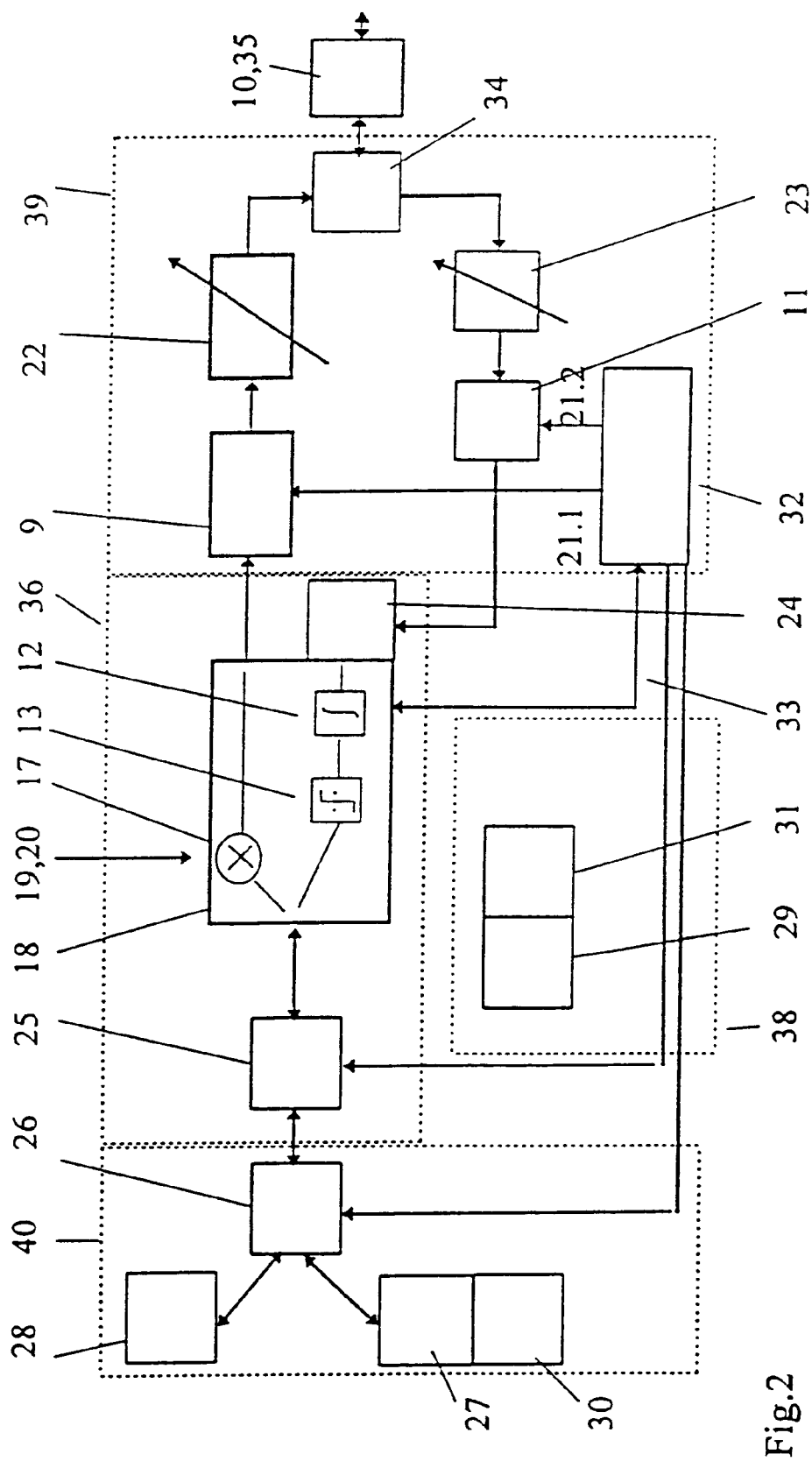
FIG. 2 a block diagram of a user terminal.

An embodiment of a user terminal 6 according to FIG. 2 basically consists of an interface functional group 40, a digital signal processing system 36, a front end to low-voltage 39, and a microprocessor system 38, each of these groups being in an area delimited by dot-dash lines. It includes the following components: a CDMA processor 18 with a multiplier 17 and an amplifier 22, a modulator 9 and a physical coupler 10, the input arrangement including a low-noise input amplifier 23, an IQ demodulator 11, an equalizer 24 and the CDMA processor 18 with integrator 12 and threshold detector 13. Furthermore, a channel encoder decoder 25, a data multiplexer/demultiplexer 26 for transferring the data to a data interface 28, and a voice and operating interface 27 are provided. The user terminal 6 further comprises a device identification unit 29, a SIM (subscriber identity module) 30, a microprocessor 31, and a clock generating unit 32, the synchronization and clock signals being shown as arrows and labeled 33. The terminal is connected to the low-voltage line 2 via a frequency separator or filter 34 and the physical coupler 10; said low-voltage line 2 also feeds the power supply unit 35 of the user terminal. The reference symbols 19, 20, and 21 represent either the spread sequence as marked by an arrow, or the direction code, or the carrier frequency, respectively.

The network interworking unit 8 represents the interface between the low-voltage communications network and the network that is commonly used for data transmission (not shown here) such as a cellular radio, telecommunication, or optical fiber network. Thus the network interworking unit 8 is to concentrate the data from the low-voltage system and to transmit them via the telecommunication network 48 to a switching center or feed the data received from said switching center into the low-voltage system for transfer to the user terminals 6.

For data transmission using the spread spectrum method, the user terminal 6 sends the data signals that are conditioned using an individual sequence of numbers to the nearest repeater unit 7 where the data received by this latter unit is detected by correlating the data stream with the number sequence assigned to the respective user terminal 6. The repeater units to be provided for data regeneration on the path towards the user terminals 6 are about 100 m apart with buried cables and placed in local line distributor boxes, lamp posts, or house connection boxes. In housing areas where cables are highly branched and where additional meters, household devices, etc. are connected, signal repeater will be required at distances of 20 to 30 m due to the great attenuation.

Voice and data transmission in this low-voltage system takes place in a frequency band of up to about 30 MHz using the direct sequence spread spectrum method and code multiplexing in order to suppress the influence of narrow-band sources of interference and to bridge long distances with low signal power, if possible without intermediate signal regeneration, and to be able to detect noisy signals for long ranges, and to allow simultaneous data transfer by multiple users. Each user terminal 6 uses its own sequence of numbers for data transmission in this code multiplex system which the higher order telecommunication system assigned to it via the network interworking unit 8 because the number of such sequences is not unlimited. These number sequences are not selected arbitrarily but from a family of codes, for example, a family of Gold sequences as the number of available sequences having a specific length is quite large here. This reduces the mutual interference of user terminals 6 to a minimum.

A user terminal 6 communicates with the network interworking unit 8 as required for initialization via the nearest repeater unit 7 where said user terminal 6 logs on using a signal that represents a number sequence reserved for this purpose, the so-called initialization sequence. The surrounding repeater units 7 respond to this initialization sequence with an identifier for the repeater unit 7, its distance from the nearest network interworking unit 8, and the ID of this network interworking unit.

Figure 7:
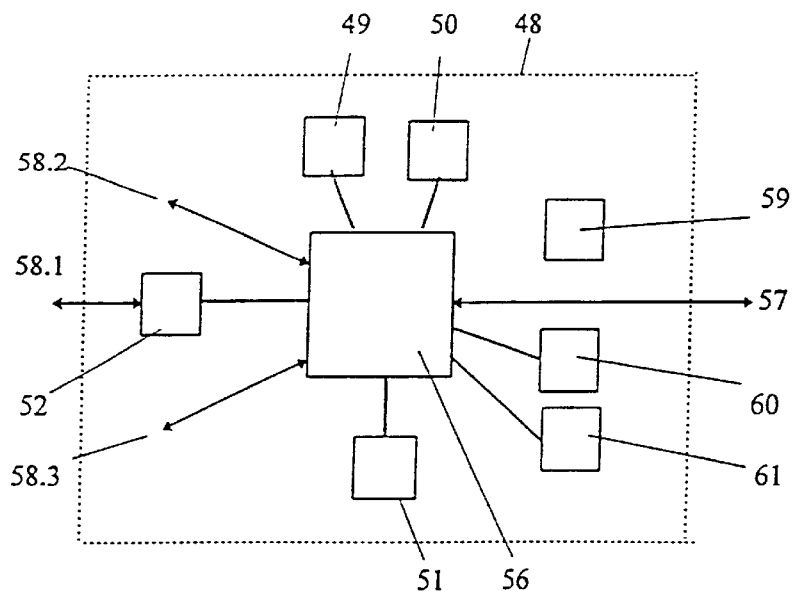
FIG. 7 a block diagram of the functional components of the higher order telecommunication network.

In the figure showing the functional components of the higher order telecommunication network 48, the switching matrix is labeled 56, the transmission paths to subscribers are labeled 58, a transit point is labeled 57, and the microprocessor unit is labeled 59. The network interworking unit 8 that was addressed first forwards the initialization of the new user terminal 6 to the higher order telecommunication network 48 which registers the location data of the new user terminal 6. Similar to processes in cellular radio networks, the home location of the user terminal 6 can be logged on to a central home location register 49 of the higher order telecommunication network 48 (FIG. 7) via the central data query of a SIM 30 of the user terminal 6, and the respective current location can be stored in a visitor location register 50 when a user moves or uses his terminal as a partly mobile phone. These registers are kept and managed at a central point of the higher order telecommunication system 48. The visitor location registers 50 list important subscriber data and the repeater units 7 or network interworking units 8 that are placed in the direct surroundings of a user terminal 6. When a user terminal 6b is in its initialization process or when a call to or from said user terminal is being set up, the switching center uses the register information from the home location and visitor location registers 49, 50 to detect the current location, and a server 51 where all repeater units 7 and network interworking units 8 of a supply area are registered calculates at least the three shortest possible routings. The central monitoring stations 52 assigned to the network interworking units 8 check the possible transmission paths as determined by the server 51 for traffic load carried. The most favorable route is selected. Alternatively, the server 51 calculates new paths. The network interworking unit 8 and repeater unit 7 determined in this way reserve the individual pseudo-random number sequences (spread sequence "19") required in each network area 2.1, 2.2 (FIG. 1) for the transmission channel requested because the user terminal 6 has not yet been assigned a sequence of its own during initialization. The individual families of pseudo-random sequences are specified by the higher order telecommunication network 48 for each network interworking unit 8 and repeater unit 7 in a network configuration process. In addition to specifying the optimum transmission path, the higher order telecommunication network 48 also checks access rights and device ID in a check register for subscriber authorization 60 and a check register for terminal approval 61 during initialization.

After the user terminal has been released, it receives a spread sequence selected either by the network interworking unit 8 or the repeater unit 7 from a family of Gold sequences. To prevent signal interference in a repeater unit 7 connected to multiple network interworking units 8 communicating with other user terminals 6, adjacent network interworking units 8 are assigned different Gold sequences by the higher order telecommunication network 48. This minimizes mutual interference of two user terminals 6 that do not communicate with the same network interworking unit 8. The spread sequence sent out to a user terminal 6 is accompanied by the device ID so that another user interface that is just initializing cannot claim these pseudo-random sequences for itself. At the end of the initialization process the user terminal 6 sends a reception acknowledgment that already is spread using the assigned number sequence. A user terminal can also initialize immediately after it has been switched on. Then it is assigned a pseudo-random sequence even without data transfer. On the other hand, initialization can be carried out when there is a communication demand, but in this case communication can be started from the terminal only. A third option would be a minimum initialization when the user terminal 6 is switched on while a pseudo-random sequence is assigned prior to a data transfer only.

The user data is spread for data transmission using the spread sequence assigned to the user terminal (see the block diagram of a user terminal 6 in FIG. 2). Furthermore, a sequence family is assigned or the data stream is multiplied by a Walsh sequence to indicate a data stream direction to enable data transfer through the low-voltage system in the desired direction. The binary data sequence produced in this way is modulated onto a carrier frequency by a modulator 9 assigned to the user terminal 6 and then fed into the low-voltage line 2 via a physical coupler 10 for transfer to a repeater unit 7.

Figure 3:
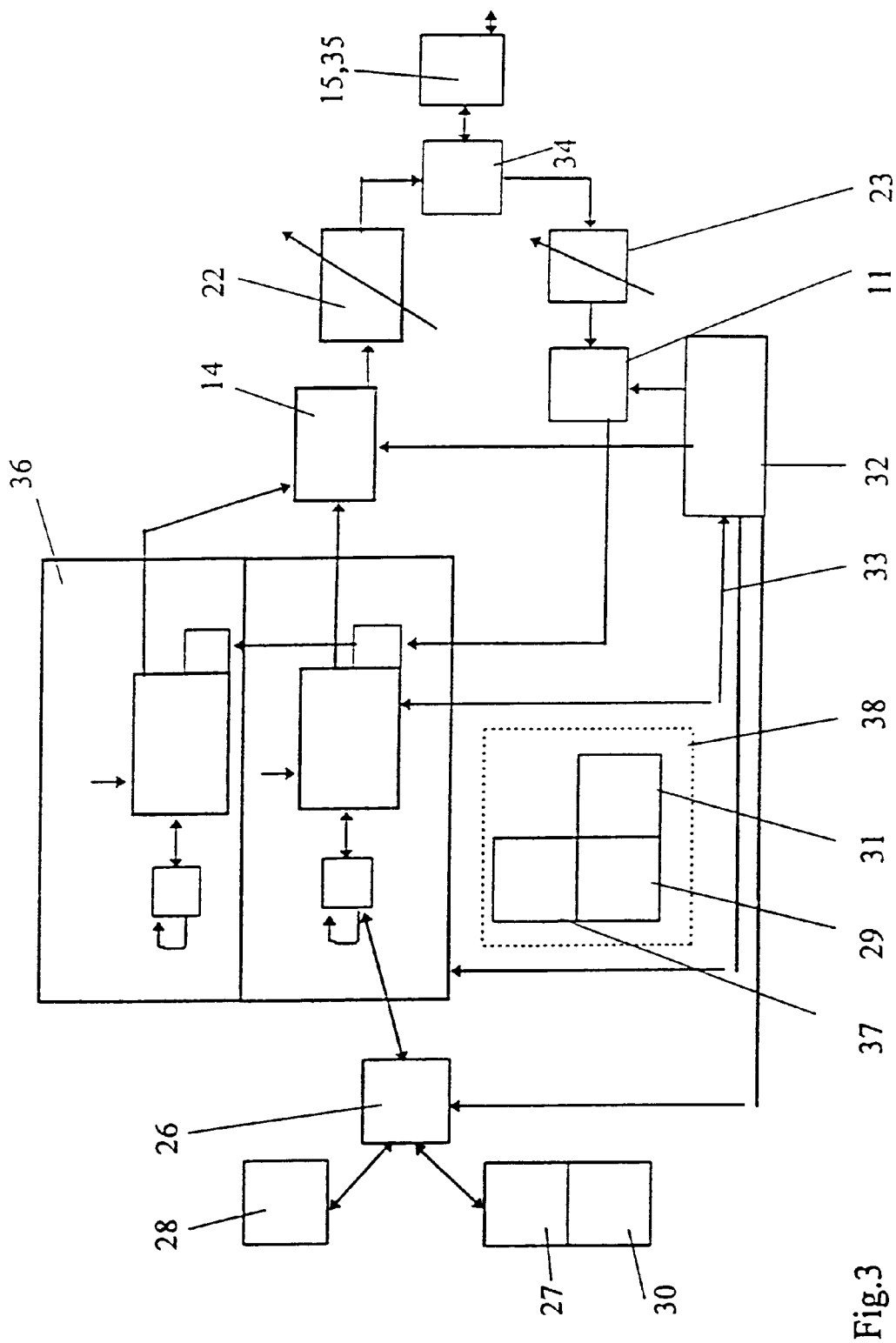
FIG. 3 a block diagram of a repeater unit with one physical coupler.

The block diagram in FIG. 3 shows a repeater unit 7 and, vis-a-vis from the user terminal 6 in FIG. 3, shows a modulator 14 and a data memory 37 assigned to the microprocessor system 38. The data input at a physical coupler 15 is retrieved using a demodulator 11, an equalizer 24, an integrator 12, and a threshold generator 13. The regenerated data is again spread using the sequence assigned to the user terminal 6 and coded, for example, with a Walsh sequence to indicate the transmission direction. A carrier frequency is modulated with the binary data in the modulator 14, and the signal thus processed is output via physical coupler 15.

Figure 3A:
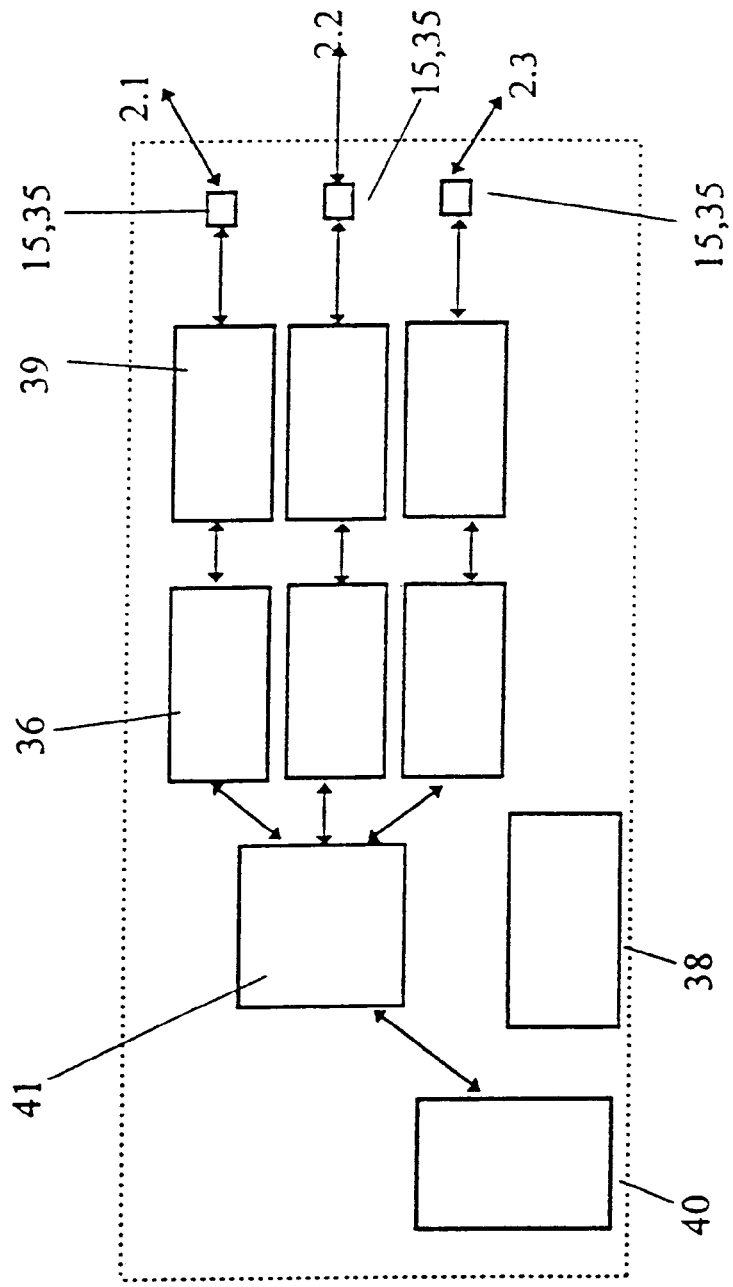
FIG. 3a a block diagram of a repeater unit for several physical couplers.
Figure 8:
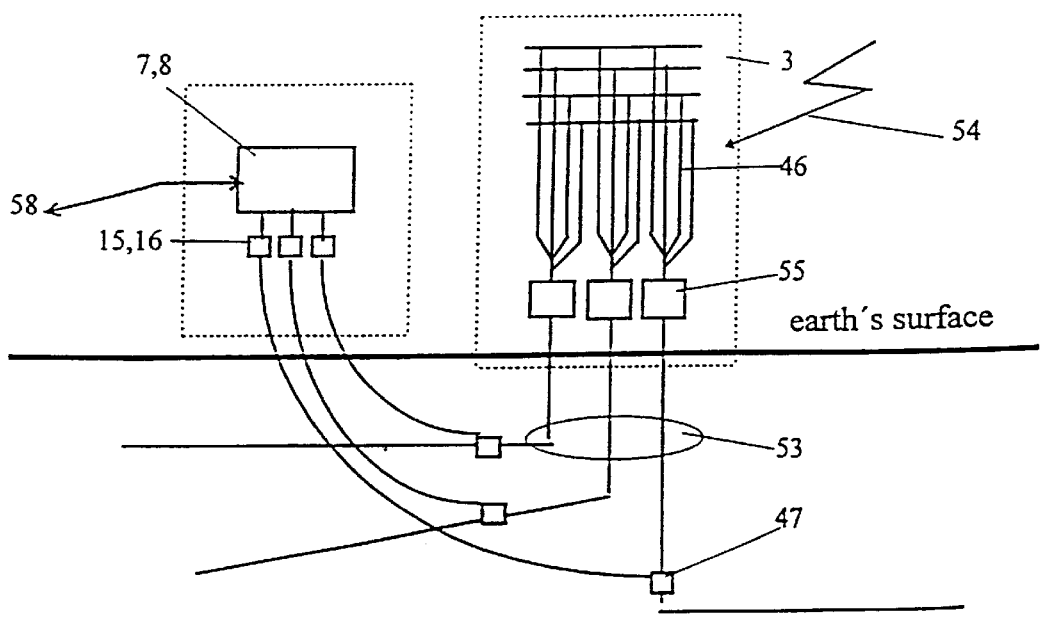
FIG. 8 a diagrammatic view of the attenuation measures against interfering inputs at a local line distributor box with connection options for a repeater unit or a network interworking unit.

The repeater unit shown in FIG. 3 is designed for repeater in a low-voltage through line. In principle, this component can be used in local line distributor boxes 3 or in network interworking units 8 when utilizing crosstalk effects, but then attenuation measures as shown in FIG. 8 are recommended. The network areas that are decoupled in this way will then have to be linked via a repeater unit according to FIG. 3a that requires a separate physical coupler 15, front end for low voltage 39 and signal processing system 36 for each network area. The regenerated 32 data is assigned to the correct network areas via a switching matrix 41 (FIG. 3a).

Figure 4:
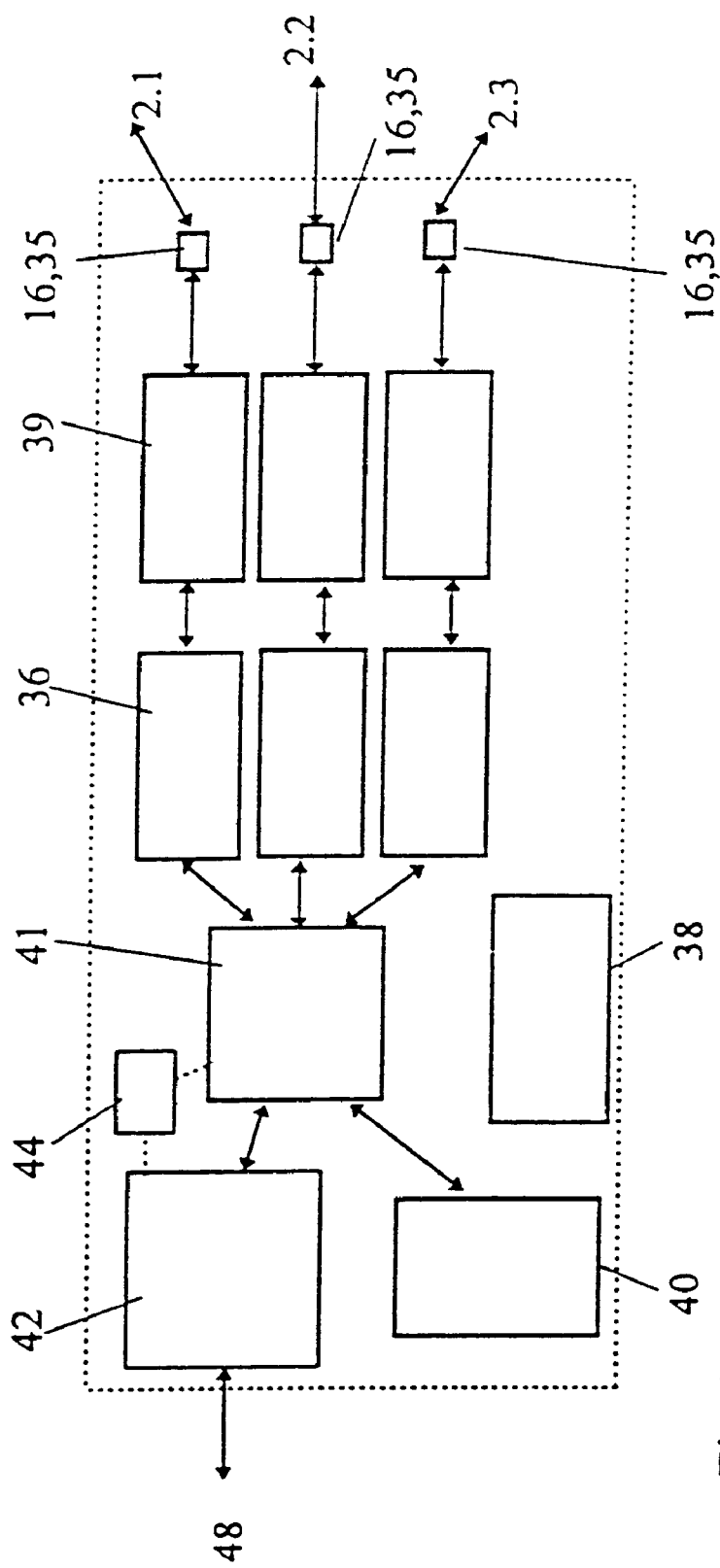
FIG. 4 a block diagram of a network interworking unit.

The network interworking unit 8 shown in FIG. 4 is similar in structure to a repeater unit but supplemented after the switching matrix by a transmission system 42 to the higher order telecommunication network 48. A data and protocol matching system 44 that matches the data signals from the low-voltage side to existing protocol structures of a higher order telecommunication system (such as Dect backbone structures) may optionally be assigned to the network interworking unit.

The process of repeater using the spread spectrum method and code multiplexing is repeated until the signal has covered the distance between the user terminal 6 and the network interworking unit 8 in one or the other direction. Data transfer from the user terminal to the network interworking unit is just slightly different from the data transfer in the opposite direction. The routes for both directions are selected by the server 51 located in the higher order telecommunication system 48 and transmitted via the network interworking unit 8 and the repeater unit 7.

Figure 5:
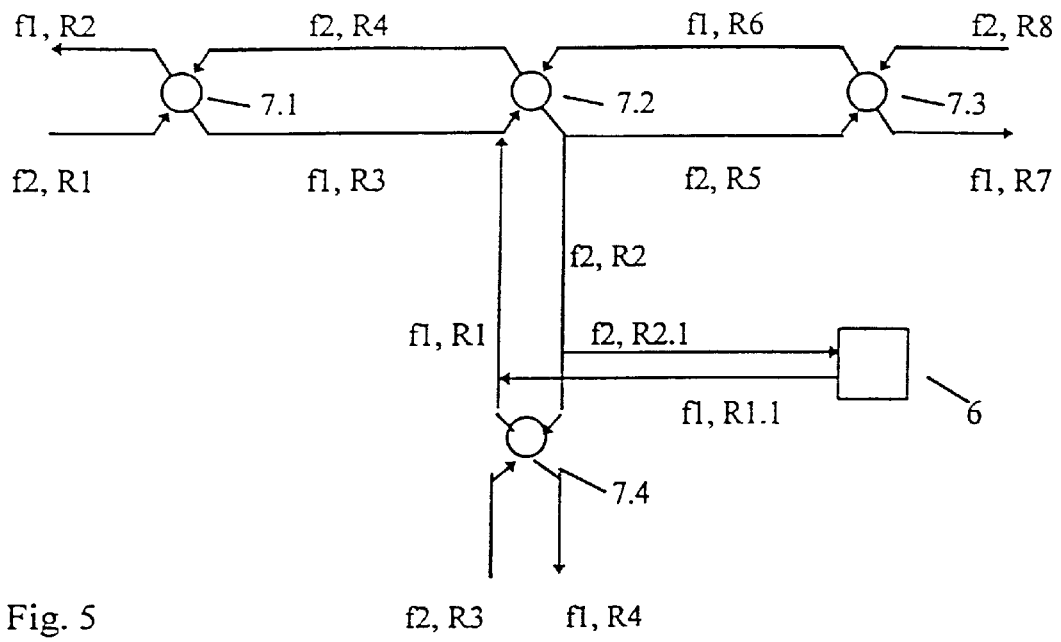
FIG. 5 a diagrammatic view of the coding of data streams to indicate a logical direction in the low-voltage system.

FIG. 5 shows the principle of direction coding of the data streams using selected sequence families or Walsh sequences which are shorter than the spread sequences used. Identification of the data streams is explained based on Walsh sequences; for example, data to be sent from repeater unit 7.1 to from repeater unit 7.3 may be given the direction code R3. Repeater unit 7.2 can detect the data with this R3 direction code (see FIG. 5) and assigns the direction code R5 to it after regeneration. The signal coded in this way and sent out will only be regenerated by repeater unit 7.3 and forwarded to the next repeater unit with the new direction code R7. As the physical medium used here, unlike other communications networks, cannot be separated in the repeater units, the coded data streams are also received by other repeater units but neither regenerated, nor coded, nor sent out again. This means that the respective repeater units only process signals that have the specific direction coding they are meant for. Thus the repeater unit 7.1 receives the data streams R5 and R2 as regenerated and coded by the repeater unit 7.2 but does not condition them because it only detects data streams with the direction codes R1 and R4 (see FIG. 5). In this way, the physical separation that is impossible under these conditions is converted into a logical separation.

The same physical separation also applies to signals that are to reach the user terminal 6. In the arrangement shown in FIG. 5, the repeater units 7.2 and 7.4 and the user terminal 6 are configured in such a way that the latter is fed and queried by repeater unit 7.2. These transmit signals with the direction code R2 are regenerated by the repeater unit 7.4 except the direction code R2.1 which is addressed to the user connected to this section and is therefore not considered for regeneration in 7.4. The paths on which a signal is received and, optionally, regenerated and amplified are set by the central server 51 in the higher order telecommunication system 48.

Figure 6:
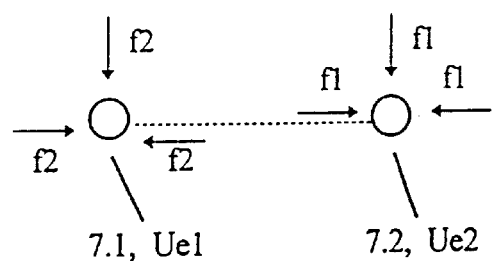
FIG. 6 a diagrammatic view of the coding of frequency assignment and the definition of points of reference for level control.

FIG. 6 shows the principle of direction splitting for the forward and back directions of two frequencies. The repeater unit 7.1 exemplifies that input signals are only transmitted on frequency f2 whereas output signals in all directions are transmitted on frequency f1. The transmit and receive frequencies are vice versa for the adjacent repeater unit 7.2. If the repeater units are arranged in a ring shape, there must be an even number of systems, and alternatively two other frequency bands have to be used for data transmission. Direction division using frequencies is required because otherwise transmit and receive signals would overlay, and the receive correlator be blocked by a transmit signal that is too high. To improve the signal/crosstalk ratio at the receiver end, all output amplifiers for all transmit signals must be adjusted to the level of the most remote receiver. If the repeater unit is 7.1, all transmitters on frequency f2 have to be adjusted to the Ue1 level at the receiver of the repeater unit 7.1 The principle of direction division for forward and back directions can alternatively be implemented using a time division multiplexer, a time buffer being required between the time slots for forward and back direction.

According to FIG. 8, high-frequency attenuation elements 55 are provided between the line terminals 46 in the local line distributor box 3 and a tapping point 47 in an unspliced section of the low-voltage cable when local line distributor boxes 3 are highly ramified to reduce the effect of interfering voltage inputs as shown by the arrow 55. A physical coupler 15, 16 to which the repeater unit 7 and the network interworking unit 8 are connected is connected via a feeder to each tapping point 47.

| | List of reference symbols |
|---|---|
| 1 | Network station |
| 2,2.1,2.2 | Low-voltage line |
| 3 | Local line distributor box |

| | -continued |
|---|---|
| | List of reference symbols |
| 4 | Branch line |
| 5 | User (house connection box) |
| 6 | User terminal |
| 7,7.1,7.2 | Repeater unit |
| 8 | Network interworking unit |
| 9 | Modulator of 6 |
| 10 | Physical coupler of 6 |
| 11 | Demodulator |
| 12 | Integrator |
| 13 | Threshold control |
| 14 | Modulator of 7 |
| 15 | Physical coupler of 7 |
| 16 | Physical coupler of 8 |
| 18 | CDMA processor |
| 19 | Spread sequence |
| 20 | Direction code |
| 21.1,21.2 | Carrier frequency |
| 22 | Controllable output amplifier |
| 23 | Controllable low-noise input amplifier |
| 24 | Equalizer |
| 25 | Channel encoder/decoder |
| 26 | Data multiplexer/demultiplexer |
| 27 | Voice and operating interface |
| 28 | Data interface |
| 29 | Device ID unit |
| 30 | SIM (subscriber identity module) |
| 31 | Microprocessor |
| 32 | Clock generating unit |
| 33 | Synchronization/clock signal |
| 34 | Frequency separator, frequency filter |
| 35 | Power supply unit or emergency power supply unit |
| 36 | Digital signal processing system |
| 37 | Data memory |
| 38 | Microprocessor system |
| 39 | Front end to low voltage |
| 40 | Interface functional groups |
| 41 | Switching matrix |
| 42 | Transmission system |
| 43 | — |
| 44 | Data rate and protocol matching system |
| 45 | — |
| 46 | Line terminal in 3, interfering source input |
| 47 | Tapping point, input for data transmission |
| 48 | Higher order telecommunication network |
| 49 | Home location register |
| 50 | Visitor location register |
| 51 | Server |
| 52 | Centralized monitoring station |
| 53 | Branched cable system |
| 54 | Noise voltage input |
| 55 | Attenuation element |
| 56 | Switching network in 48 |
| 57 | Transit point |
| 58 | Transmission path to subscriber |
| 59 | Microprocessor unit in 48 |
| 60 | Check register for subscriber authorization |
| 61 | Check register for terminal approval |
| R1, R2 etc. | Direction codes |
| f1, f2 | Modulation frequencies |
| Ue1, Ue2 | Receiving levels |

We claim:
1. A data transmission method for two-way communication using low-voltage systems linked to a higher order telecommunication network, wherein data transmission within the low-voltage system takes place at a high-frequency range of up to 30 MHZ using band spreading of data signals and a transmit level below the specified interference or noise voltage limit of line and radio disturbances characteristics, in that said band-spread data is given a direction coding to specify a logical direction within the low-voltage system to enable multiple-user operation using different sequences of a family of pseudo-random numbers, and in that a correlator identifies in attenuation-dependent intervals by means of the given sequences the binary data sequences, being user-specific spread and direction-specific coded, within the low-voltage system, regenerates the binary data sequences and assigns new direction codes to them for forwarding the signals.

2. The method according to claim 1, wherein user-specific band spreading of data signals is carried out using sequences of one or more matched families of pseudo-random number sequences such as Gold sequences.

3. The method according to claim 2, wherein adjacent sequences of pseudo-random numbers do not contain similar sequences to prevent mutual interference of users located in different network areas.

4. The method according to claim 1, wherein the data stream is multiplied by a Walsh sequence after band spreading using the direct sequencing method to give the data stream a logical direction in the low-voltage network.

5. The method according to claim 4, wherein the length of the Walsh sequences used for direction coding is smaller than the band spreading sequences used.

6. The method according to claims 1, wherein the logical direction of the data stream in the low-voltage system is identified by controlled and structured assignment of select families of pseudo-random number sequences to individual network areas that are enclosed by two repeater units or by one repeater unit and a network interworking unit.

7. The method according to claim 1, wherein directions are separated using time or frequency multiplexing and that the band-spread signals are transmitted in the transmit and receive directions on separate time slots or frequency bands.

8. The method according to claim 1, wherein the transmit levels of each transmitting unit in a network area are set in such a way that all overlaid signals of one frequency comprise nearly the same level at the receivers of the repeater or the network interworking unit in the controlled period.

9. The method according to claim 1, wherein prior to the actual data transfer, an initializing phase is provided comprising the output of an initializing sequence plus the ID of the respective user and of the user terminal and a log on sequence, and subsequent assignment of a spread sequence to the respective user.

10. The method according to claim 9, characterized in that the IDs of the respective user and the user terminal are checked for device approval of the terminal and communication authorization of said user in the higher order telecommunication network after sending out the initialization sequence.

11. The method according to claim 9, wherein emergency call signals can be output with the initialization sequence.

12. An arrangement for data transmission comprising a low-voltage system, in which data transmission takes place at a high-frequency range of up to 30 MHZ using band spreading of data signals users connected to it via user terminals, local line distributor boxes and network stations, and a higher order telecommunication network connected to said low-voltage system, characterized in that network interworking units are assigned to the network stations to link the low-voltage system and the higher order telecommunications network and for channel assignment in the respective transmission medium, and that repeater units are placed at specific distances in the low-voltage system for regenerating and direction-specific forwarding of the data signals to a subsequent repeater unit or to a user terminal or to a network interworking unit.

13. The arrangement according to claim 12, wherein the user terminal is associated with the following functional units: physical coupler, frequency separator or filter, controllable low-noise input amplifier, IQ demodulator, modulator, controllable output amplifier, equalizer, CDMA processor, channel encoder/decoder, voice/data multiplexer, voice and operating interface, data interface, SIM (subscriber identity module), device identification unit, microprocessor, central clock generating unit, synchronization facility, emergency power supply unit or power supply unit and controllers for controlling the input and output levels.

14. The arrangement according to claim 13, wherein a CDMA processor is provided for spreading the data and adding the direction code using its allocated spread sequence, a modulator for modulating the signals onto a carrier frequency, an amplifier to adjust the input level required at the receiving end for optimum correlator performance, and a physical coupler for feeding the spread and direction-coded data stream into the low-voltage line and forwarding it to the repeater unit or network interworking unit.

15. The arrangement according to claim 12, wherein the layout of the repeater unit is basically similar to that of the user terminal, whereby the repeater units and if applicable parts of a clock generating unit and of the synchronization facility are configured in accordance with the number of channels to be regenerated multiplied by the number of signaling directions, and a error-corrected data signals are fed from the channel decoder into the next channel encoder either directly or via a switching matrix, and in that a data memory managed by a microprocessor or a customer-specific circuit is provided in which the current channel assignments with the associated direction codes, the sequence to be used as well as other signal source and sink information are stored.

16. The arrangement according to claim 15, wherein the repeater unit is designed for use in local distributor boxes and comprises additional physical couplers, modulators, demodulators, controllable output and low-noise input amplifiers, controlling facilities for transmit and receive signals and frequency separators or filters depending on the number of network areas to be covered.

17. The arrangement according to claim 15, wherein a CDMA processor of the repeater unit that is connected to an equalizer on its receive side comprises an integrator and a threshold detector for retrieving the data transmitted, and that the CDMA processor is equipped with a multiplier for multiplying the regenerated data signal on the transmit side with a spread sequence and a direction code of the user terminal to be addressed or the repeater unit.

18. The arrangement according to claim 12, wherein the layout of the network interworking unit is basically similar to that of the repeater unit but that the functional groups of digital signal processing and if applicable a clock generator are configured as multiple units, at least in accordance with the simple number of transmission channels provided to the higher order telecommunication facility plus the number of synchronization channels required for each low-voltage line, and that physical couplers and front ends to low voltage are provided in accordance with the number of low-voltage areas to be covered, and in that a microprocessor system is provided for channel assignment by configuration of a switching matrix and CDMA processors.

19. The arrangement according to claim 18, wherein a device ID unit and a data memory for storing data of all active connections consisting of routing information, channel assignment, signal quality, user terminal ID, services used, and the assigned transmission channel, are assigned to the higher ordered telecommunication center station.

20. The arrangement according to claim 18, wherein data rate systems and protocol matching systems are provided between the switching matrix and the higher order telecommunication network to make the data compatible for a data service.

21. The arrangement according to claim 17, wherein the decoded data signals are fed into the transmission system via the switching matrix, and that n * 2 Mbps transmission systems for copper or optical fiber lines or cellular radio connections are provided on the telecommunication network side for n=1, 2, 3.

22. The arrangement according to claim 12, wherein all active components are connected to a power supply unit and to physical couplers, and that they are equipped with an emergency power supply unit.

23. The arrangement according to claim 12, wherein in areas where cable systems are highly branched and/or where there are noise voltage inputs for the frequency range of data transmission on the low-voltage line, attenuation elements are placed between the noise voltage input point and the input point for the data transmission system.

24. The arrangement according to claim 12, wherein the repeater units are placed in or close to local line distributor boxes, lamp posts, and house connection boxes, the distance between repeater units being about 100 m or considerably smaller in areas of strong attenuation.

25. The arrangement according to claim 12, wherein the higher order telecommunication network includes a home location register and a visitor location register for managing a partly mobile service, a check register for subscriber authorization, a check register for registration of approved terminals, monitoring stations for monitoring data exchange of network interworking and repeater units as regards traffic load, quality and availability, a switching network for forwarding calls from the low-voltage system to a transit point or the initialization channels to the microprocessor system, a server for selecting the shortest routes to the subscriber, and a microprocessor unit for determining the optimum route from the switching center to the subscriber.

26. The arrangement according to claim 13, wherein the functional units of the user terminal except the voice and operating interface are grouped in a plug-in adapter for connecting commercial voice and data communication terminals to a low-voltage socket that supports the service-specific physical interfaces and the associated protocol stack on the terminal side.

27. The arrangement according to 13, wherein the functional units of the user terminal except the voice and operating interface are connected to the power supply unit of a power consumer for operation of voice and data services.

28. The arrangement according to 13, wherein functional units of the user terminal are integrated into electric consumers with direct clamp-type, screw-type, or plug-in connection to the power network for their remote monitoring and control.

29. The arrangement according to claim 12, wherein a wideband cable system is provided instead of the low-voltage line.

* * * * *

UNITED STATES PATENT AND TRADEMARK OFFICE
CERTIFICATE OF CORRECTION

PATENT NO.    : 6,507,573 B1
DATED         : January 14, 2003
INVENTOR(S)   : Frank Brandt et al.

It is certified that error appears in the above-identified patent and that said Letters Patent is hereby corrected as shown below:

Column 8,
Line 40, after "The regenerated" delete "32".

Column 11,
Line 21, "according to claims 1" should read -- according to claim 1 --.

Column 12,
Line 23, "and of the " should read -- and of a --.
Line 26, "a error-corrected" should read -- an error-corrected --.
Line 27, "the channel" should read -- a channel --.

Column 13,
Line 6, "according to claim 17" should read -- according to claim 18 --.

Signed and Sealed this

Twenty-ninth Day of June, 2004

JON W. DUDAS
*Acting Director of the United States Patent and Trademark Office*